Dec. 6, 1955 J. L. PETTUS ET AL 2,726,286

INTERFERENCE-FREE MULTI-MAGNETIC TRACK SYSTEM

Filed Aug. 16, 1952

INVENTORS,
JAMES LAWRENCE PETTUS,
ARTHUR CRAIG BLANEY

BY [signature]

ATTORNEY

United States Patent Office 2,726,286

Patented Dec. 6, 1955

2,726,286

INTERFERENCE-FREE MULTI-MAGNETIC TRACK SYSTEM

James L. Pettus, Encino, and Arthur C. Blaney, Los Angeles, Calif., assignors to Radio Corporation of America, a corporation of Delaware Application August 16, 1952, Serial No. 304,768

7 Claims. (Cl. 179—100.2)

This invention relates to magnetic sound systems, and particularly to cross-talk or interference prevention between channels in a multi-track magnetic sound recording or reproducing system.

In magnetic sound systems, wherein several tracks are recorded longitudinally of the film and parallel to the center line of the film, particularly with magnetic heads positioned axially and transversely of the film, such as shown in Pettus co-pending U. S. application, Ser. No. 230,403, filed June 7, 1951, now Patent No. 2,644,856, granted on July 7, 1953, there is a certain amount of magnetic coupling between each head which introduces interference in the form of cross-talk. The present invention is directed to a construction which will reduce, if not entirely prevent, such cross-talk.

In several types of multi-track recording and reproducing systems, the heads are generally positioned just before or after the film leaves a stabilizing drum or roller. The heads themselves are separated by magnetic shields such as flat plates of mu metal and also housed in a shielding cover of similar material. However, the pole pieces extend beyond the covers, and, therefore, a certain amount of magnetic coupling exists therebetween, particularly when the recording or reproducing gaps are closely adjacent one another.

Cross-talk, therefore, is attributable to two sources. First, when a signal is being recorded in one track position, a small amount of flux passes through the adjacent track area and a low level recording of the signal occurs therein. When the second track is recorded in the adjacent track area and reproduced, the first signal is heard during low level passages of the second signal. This is also true when the first signal is reproduced, its track area having some of the second signal therein. The second source of cross-talk is due to the actual coupling produced by the flux variations generations during detection being induced in an adjacent head. To reduce this coupling, stationary finger type shields are positioned on the opposite side of the film from the heads, and between planes passing through the center of and perpendicular to the gaps in the heads, the edges of the shields lying closely adjacent the film, but not contacting it, and extending into annular grooves in the film stabilizing drum or roller. This method of cross-talk prevention has the advantage over electrical neutralization obtained by interconnecting the channels in phase opposition, since the present method will function when the signals are recorded or reproduced at different times, while the electrical method requires simultaneous recording and reproduction of the multiple signals. In co-pending U. S. application, Ser. No. 304,829, filed August 16, 1952, a form of this type of shielding is disclosed and claimed, but the form of shielding described hereinafter is more efficacious, particularly when the heads are positioned away from drums and rollers.

The principal object of the invention, therefore, is to facilitate the reduction or elimination of interference between reproduced signals from a multi-magnetic track record.

Another object of the invention is to reduce or eliminate coupling between adjacent magnetic recording or reproducing heads and to confine a recorded signal to its own track area.

A further object of the invention is to prevent inductive coupling between magnetic heads in a multiple channel recorder or reproducer and to prevent parasitic recording in other signal recording areas by stationary shields on the side of film opposite the heads and lying in planes passing through the center of and perpendicular to the gaps of the heads.

A still further object of the invention is to provide improved cross-talk prevention between multiple recording channels by L-type magnetic shields having ends extending into recesses in a magnetic film stabilizing drum or roller.

Although the novel features which are believed to be characteristic of this invention will be pointed out with particularity in the appended claims, the manner of its organization and the mode of its operation will be better understood by referring to the following description, read in conjunction with the accompanying drawings in which:

Figure 1:
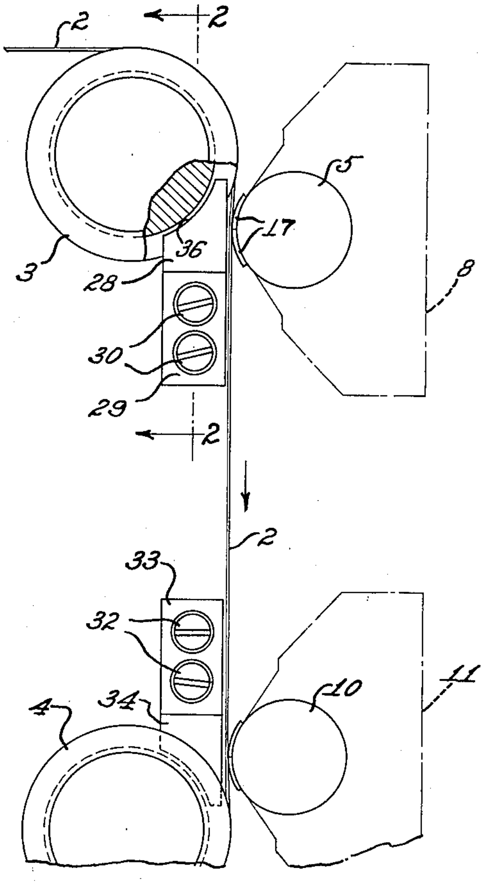
Fig. 1 is an elevational view of a multi-track recordng or reproducing system embodying the invention.
Figure 3:
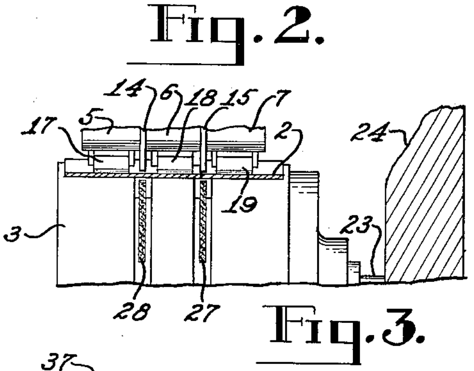
Fig. 3 is a partial cross-sectional view taken along the line 3—3 of Fig. 2.

Referring now to the drawings, in which the same numerals identify like elements, a magnetic film 2 is shown passing over a stabilizing roller or drum 3 and then over a second stabilizing roller or drum 4, as shown by the arrow. Any suitable means, not shown, may be employed for driving the film. A plurality of axially arranged magnetic heads 5, 6, and 7 in a mount 8 are shown positioned closely adjacent the drum 3, transversely of the film 2, while a similar group of magnetic heads, one of which is shown at 10 in mount 11, is shown positioned closely adjacent the drum 4. The magnetic heads are separated by magnetic shields, such as discs 14 and 15 of mu metal, and are enclosed in a shielding cover of similar material, although the pole pieces 17, 18, and 19 extend beyond the cover, as shown in Figs. 1 and 3. The edges of the shields 14 and 15 are positioned closely adjacent the film 2. However, it is between the pole piece extensions that the electromagnetic inductive coupling occurs, which is one cause of cross-talk and interference between the signals in the individual channels. Another cause of interference is the stray or fringing flux which records a low level signal in the sound track areas of other signals.

Figure 2:
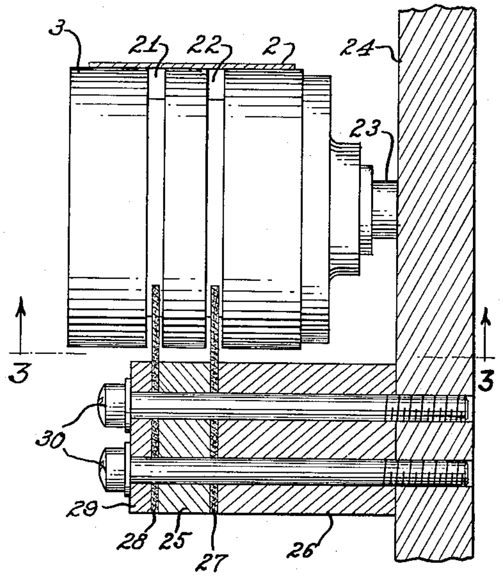
Fig. 2 is a cross-sectional view of a portion of the system shown in Fig. 1.

To reduce the electromagnetic coupling or parasitic recording, the drums 3 and 4 have recesses or annular grooves therein, as shown at 21 and 22 in drum 3 of Fig. 2, the drum being mounted on a shaft 23 in the panel 24. Also mounted on the panel 24 is a non-magnetic block 26 which forms a support for an elongated or finger type of plate shield 27 of mu metal or similar material. The next element is a second non-magnetic block 25, which forms a support for a second finger plate shield 28. A strap 29 is then positioned on the other side of shield 28, and the entire assembly is held together by screws 30. A similar unit is provided for the heads adjacent the drum 4, as shown by screws 32, strap 33, and shield 34. These finger shields have their unsupported ends curved, as shown at 36, so that more of the shields are closely adjacent the bottom surfaces of the grooves 21 and 22.

They are positioned to have their edges closely adjacent the film 2, but not in contact with the film. The shields 27 and 28 are on the opposite side of the film from shields 15 and 14, respectively, and are thus in the same planes as shields 14 and 15 and between planes passing through the center of and perpendicular to the gaps of the heads 5, 6, and 7.

It has been found that the above type of shielding reduces the cross-talk effect in the order of ten to twelve decibels, compared with the same magnetic head arrangement not having the de-coupler shields. This is due to the practically complete reduction of parasitic recording in the areas of the other signals as well as preventing induction between heads. One of the features of this invention is that the shields are stationary and may be placed in their optimum shielding position, regardless of the position of the heads with respect to the drums or rollers. If the heads are a considerable distance from the drums, the drums need not be grooved as the shields do not have to extend to the drums.

Figure 4:
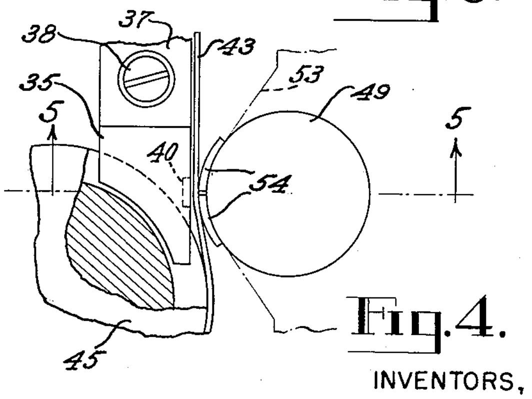
Fig. 4 is a detailed view showing a modification of the invention shown in Figs. 1, 2, and 3.
Figure 5:
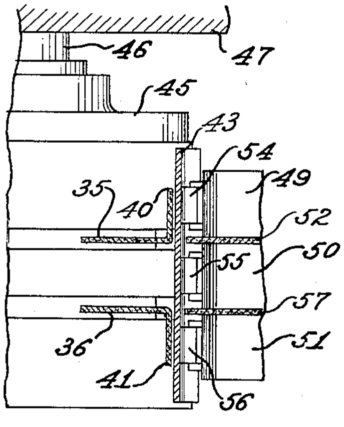
Fig. 5 is a cross-sectional view taken along the line 5—5 of Fig. 4.

A modification of the shielding shown in Figs. 1, 2, and 3 is shown in Figs. 4 and 5, wherein a set of shields 35 and 36, with their strap 37 and mounting screw 38, is similar to the construction in the above described figures. However, the shields 35 and 36 are now provided with tabs 40 and 41 at right angles to the surface of the shields 35 and 36 and positioned opposite the gaps of the outside magnetic heads 49 and 51 and adjacent the film 43.

A film stabilizing drum or roller into which the shields 35 and 36 extend is shown at 45 with its shaft 46 mounted in a panel 47. The three heads are shown at 49, 50, and 51 with their separating shields 52 and 57. The mount for the head is indicated at 53, the extending pole pieces being shown at 54, 55, and 56.

It has been found that these tabs are effective in reducing stray magnetic fields which introduce hum or noise. Therefore, improvement is realized in the signal-to-noise ratio over that present when no form of shielding is used, since it is well-known that the most effective hum shield is one which covers the magnetic head gap as closely as possible. The size of the tabs need only be such as to cut the stray lines of magnetic flux at ninety degrees to the plane of the magnetic head gap for maximum shielding. No tab shield is positioned opposite the head 50, since this head is protected from its adjacent heads by shields 40 and 41, these shields also protecting heads 49 and 51 from head 50. These tab shields also aid in preventing induction between the pole pieces of the heads and the respective sound track areas from receiving recordings of adjacent heads.

In one embodiment of the invention, using thirty-five millimeter film with three tracks, the finger shields 27, 28, 35, and 36 were one-half inch wide, two inches long, and .05 of an inch thick. The strap 29 was one-eighth of an inch thick, the block 25, .03 of an inch thick, and the block 26, .99 of an inch thick. The width of the block is seven-eighths of an inch, and the screws 30 are spaced three-eighths of an inch between their centers. The tabs were of the same thickness as the shields and about one-fourth of an inch square.

We claim:

1. A shielding system for preventing interference between plural magnetic channels utilizing a plurality of magnetic heads for cooperation with a magnetic film movable along a predetermined path, said system comprising means for positioning said film for movement along said path, means mounting said plurality of magnetic heads adjacent said path to contact said film, and a thin, flat, stationary shielding member on the side of said film path opposite said heads and closely adjacent said film path and lying in a plane between planes perpendicular to the gaps in two adjacent heads.

2. A shielding system for preventing interference between plural magnetic channels utilizing a plurality of magnetic heads for cooperation with a magnetic film movable along a predetermined path, said system comprising means for positioning said film for movement along said path, means mounting said plurality of magnetic heads adjacent said path to contact said film, and a stationary shielding member on the side of said film path opposite said heads and closely adjacent said film path and lying in a plane between planes perpendicular to the gaps in said adjacent heads, said positioning means being a drum having annular grooves therein, the ends of said shields being positioned in said grooves.

3. A shielding system in accordance with claim 2, in which a tab is provided on said stationary shield and positioned opposite the gap of one of said heads on the opposite side of said film from said gap.

4. A shielding system for preventing cross-talk between sound tracks recorded side by side on a magnetic film movable along a predetermined path comprising a plurality of magnetic heads transversely of said film path for recording and reproducing parallel tracks on said film, means for holding said film in contact with said heads, a plurality of thin magnetic stationary shields lying in planes perpendicular to the surface of said film when said film is disposed in said path with the edges of said shields closely adjacent said film path but separated therefrom, said shields being on the side of said film path opposite said heads and in planes parallel with and between planes passing through the center of and perpendicular to the said film surface.

5. A shielding system in accordance with claim 4, in which thin plate shields are provided between said heads, said shields being in the same planes as said first mentioned planes.

6. A shielding system in accordance with claim 4, in which tabs are attached to the edges of said shields and perpendicular to the surface of said shields and positioned opposite certain of the gaps in said heads and on the side of said film opposite said heads.

7. A shielding system in accordance with claim 4, in which said holding means is a drum having annular grooves therein, the ends of said shield extending into said grooves, said heads being positioned adjacent said drum.

References Cited in the file of this patent

FOREIGN PATENTS 69,273 Norway ---------------- May 28, 1945